Patented June 11, 1946

2,401,879

UNITED STATES PATENT OFFICE 2,401,879

PURIFICATION OF CRUDE TRINITROTOLUENE

Ralph H. McKee, New York, N. Y.

No Drawing. Application December 3, 1940,
Serial No. 368,391

8 Claims. (Cl. 260—645)

This invention relates to the purification of crude nitro-derivatives of aromatic hydrocarbons, and more particularly to the purification of crude trinitrotoluene.

The principal object of the present invention is to provide an improved process of purifying crude nitro-derivatives of aromatic hydrocarbons.

An important object of the present invention is to provide an improved process of purifying crude trinitrotoluene.

Another object of the present invention is to provide a simple and efficient process of treating crude trinitrotoluene to remove therefrom mononitrotoluenes, dinitrotoluenes and metatrinitrotoluene, without decomposition of the trinitrotoluene being purified.

Other objects and advantages of the invention will become apparent during the course of the following description.

As is well known, trinitrotoluene as produced commercially contains mononitrotoluenes, dinitroluenes, and metatrinitrotoluene as impurities in the product. There are, of course, three mononitrotoluenes (ortho, meta and para); a larger number of dinitrotoluenes are possible; and, in practice, there are two trinitrotoluenes, although theoretically there might be several. The trinitrotoluene with which the present invention is primarily concerned is the ordinary or 2, 4, 6-trinitrotoluene.

As is understood in the art, the purity of trinitrotoluene as prepared industrially is checked by a determination of the melting point of the product. In present practice the melting point of the crude product is in the neighborhood of 77° C. A product of such melting point is not sufficiently pure for many requirements. For example, the United States Army requirement is such that the crude trinitrotoluene must be purified, by freeing it from other nitrated bodies, to such an extent that the purified product will have a melting point or "setting point" of at least 80.2° C.

Several methods of purifying crude trinitrotoluol, to remove other nitrated bodies therefrom in order to raise the melting point of the product, have heretofore been proposed, and two of such methods have been extensively used.

The older method, which has been most widely used, involved the washing or crystallizing from alcohol. The new method, which is the present United States Army requirement and which has been lately used in European plants, involves the treatment of the trinitrotoluene, either in molten form or in finely granulated form, with a solution of sodium sulfite ($Na_2SO_3$) or a mixture of sodium sulfite with sodium bisulfite ($NaHSO_3$). A product of this treatment is of more stable character than that produced by the alcohol treatment.

The treatment with sulfites dissolves and decomposes the lower nitrated bodies, say mononitrotoluols or any of the dinitrotoluols and the undesired metatrinitrotoluol which is present in a normal nitration of 2 to 4% of the product. In the case of the last compound the theory is that it forms a sodium sulfonate by replacing one of the nitro groups to produce a water soluble product which is washed out with the sodium sulfite solution.

The method of purification with sulfites has the disadvantage that a part of the desired trinitrotoluene is decomposed and lost as a result of a reaction of the sodium sulfite, which is an alkali, with the desired trinitrotoluene. In other words, there is not only a decomposition of the undesired nitro-products but also a decomposition of a portion of the desired trinitrotoluene. This results in a decrease of yield. For example, 100 pounds of the 77° C. product may produce only about 85 or 90 pounds of the 80.2° C. product.

Moreover, the decomposition products and other products dissolved by the hot sodium sulfite solution are largely lost and are unable to be used for other purposes. In addition, the sodium sulfite solution itself is decomposed and lost in the process so that it cannot be reused except in part.

As a result of extensive research and experiments, I have developed a process of purifying trinitrotoluene (and other nitro bodies, as will more fully hereinafter appear) which overcomes the disadvantages of the prior purifying processes and which, in addition, is adapted to best commercial practice.

In a broad way, my process consists of the treatment of crude trinitrotoluene with a hydrotropic solvent which will dissolve but not decompose the various nitro-derivatives present as impurities, such as the mono- and di- nitrotoluenes and the undesired metatrinitrotoluene, but in which the ordinary 2,4,6-trinitrotoluene is soluble only in traces.

The hydrotropic solvent used in the practice of my process consists of an aqueous solution of a readily soluble salt of an organic acid of a concentration to give a hydrotropic solvent for the nitro-derivatives present as impurities in the crude trinitrotoluene. By "readily soluble" is meant that the solubility of the salt is greater than about 50 parts in 100 of water at room temperature. Of course, the concentration of the salt in the aqueous solution to provide the hydrotropic solvent action will vary according to the salt selected, the temperature to be employed in the purifying operation, and the length of time to be involved in the treating operation. However, I have found that a solution having a concentration of over 10% of the hydrotropic salt will serve as a hydrotropic solvent with some measure of success.

Many readily soluble metallic salts of organic acids give, with water, hydrotropic solvents useful in the practice of the process. However, I prefer to employ salts of organic acids derived from a single benzene ring. Typical salts which are suitable for use in the practice of the present process are alkali metal salts of benzoic, xylenesulfonic and cymenesulfonic acids. The alkaline earth salts of such acids, such as calcium cymenesulfonate or ammonium cymenesulfonate, will also work in the practice of the present invention, but I prefer to use the alkali metal salts.

Of the above mentioned hydrotropic salts, sodium xylenesulfonate is preferred. In moderate concentrations, it is an excellent solvent, and when diluted to a moderate degree with water, it loses almost all of its solvent character and permits the nitro-derivatives dissolved therein to be precipitated and recovered. In preferred practice, the process is operated with an approximately 50% solution of sodium xylenesulfonate, that is, 50% of the salt and 50% of water, although when the invention is practiced as a continuous process, as described below, a solution of lower concentration may advantageously be employed.

Sodium cymenesulfonate serves approximately as well as sodium xylenesulfonate. This particular salt is somewhat more effective at a lower concentration, say a concentration of 20 to 30%.

Sodium benzoate also works satisfactorily but since it is much more expensive than the other hydrotropic salts referred to above, its use is not commercially practicable.

In the practice of my process, the crude trinitrotoluene to be purified is subjected to the action of the hydrotropic salt solution selected. The process may be practiced either as a batch procedure or as a continuous process in a suitable column, such as a plate and cap distilling column. In either case, the crude material is contacted with the hydrotropic solvent and the lower nitrated bodies and the undesired metatrinitrotoluol are removed in solution from the trinitrotoluene being prified. Since it is advantageous to treat the crude trinitrotoluene in liquid form, I prefer to carry out the process at a temperature above 80° C.

After the crude trinitrotoluene has been contacted with the hydrotropic solvent for a sufficient period to dissolve out the undesired nitrated bodies, which only requires a relatively few minutes, the undissolved trinitrotoluene is separated from the accompanying solution by decantation or filtration and is thereafter washed, pelleted and dried.

The filtrate, i. e., the solution of the undesired nitro products in the hydrotropic solvent, is then treated to remove such nitro products therefrom. This is most easily accomplished by diluting the filtrate with water to precipitate the nitro products. Upon dilution, the hydrotropic solvent loses its solvent character for these nitro products, causing the latter to be precipitated. Since each of the nitro bodies present in the filtrate has its own solubility in the hydrotropic solvent, the mono- being much more soluble than the di-, and the di- being much more soluble than the tri-, it is possible by regulated progressive dilution to precipitate and recover the several nitro bodies separately. Of course, the relative solubilities of these nitro bodies vary somewhat with the concentration of the hydrotropic solvent, the temperature, the choice of the hydrotropic salt, etc. However, in any case, the separate precipitation and recovery of the several bodies can be effected by careful control of the progressive dilution of the filtrate.

In general practice, it may be found most convenient to separate all of the nitro bodies from the filtrate at one time by substantial dilution of the solution with water. After the nitro products have been precipitated out of the hydrotropic solution by such dilution, these products are filtered off and either reworked into the desired trinitrotoluene or used for other industrial purposes. The filtrate, such as a diluted xylenesulfonate solution, may then be readily reconcentrated for further use in the practice of the process, as by distilling off the water used for dilution. It will thus be apparent that in this process the hydrotropic solvent solution can be reused a very large number of times, say ten or twenty times, before it needs to be discarded or purified.

Moreover, since in the practice of this process pH of the solvent is not a determining factor and as there is no chemical decomposition of the desired trinitrotoluene, there is no material loss of this product, as in the sulfite method of purification. The very small amount of trinitrotoluene which goes into the solution along with the undesired nitro products can be recovered by reworking the product. Moreover, the mono- and di-products can be worked by further nitration to give the desired 2,4,6-trinitrotoluene. The meta-triproduct is a good explosive but has to be kept separate from the 2,4,6-trinitrotoluene. Thus, with the present process, all products are recovered for use and there is no occasion for loss except small mechanical loss. In addition, the solvent, unlike the alcohol used in the former alcohol purification method, is not inflammable and is cheap and can be manufactured in the same equipment as the trinitrotoluene itself. Another advantage is that the process can be carried out as a continuous process, whereas the sulfite method of purification has always been carried out as a batch process.

The following specific examples are illustrative of specific embodiments of the present invention and it is to be understood, of course, that the practice of the invention is not limited to these specific methods:

*Example I*

When operating the process as a batch procedure using a crude trinitrotoluene having a melting point of 75° C., 25 parts of molten trinitrotoluene, at a temperature of 90° C., were stirred with four times its weight of a hot 50% solution of sodium xylenesulfonate. The solvent was decanted and the partially purified trinitrotoluene was then stirred with a second portion of an equal amount of the hydrotropic solvent. This amount of solvent was decanted and the melted trinitrotoluene then washed with water. The thus purified trinitrotoluene was found when dry to have a setting point of 80.2° C.

*Example II*

When operating the process as a continuous one, it is preferred that the process be carried out in a column of the type of a plate and cap distilling column, or a closed inclined heated wood trough with baffles therein for counter-current extraction of one liquid with another. In such case, a stream of molten trinitrotoluene, say at a temperature of 90° C., was washed with a counter-current of hot sodium xylenesulfonate, 34% solution, the resulting partially purified trinitrotoluene then washed in another similar column or trough with water to remove any traces of sodium xylenesulfonate, and the thus purified trinitrotoluene then dried and granulated. As in the prior example, there resulted from this particular treatment a trinitrotoluene having a setting point of approximately 80.2° C.

While the present process is primarily concerned with the purification of crude trinitrotoluene, it is also applicable to the purification of other crude nitro-derivatives of aromatic hydrocarbons. For example, the process is applicable to the purification of such nitro products as trinitrobenzol and the nitrated aniline known as Tetryl (trinitrophenylmethylnitroamine).

The term "hydrotropic" is used herein in its physico-chemical sense, i. e., as applying to materials which have the property of transforming certain substances normally insoluble in water into clear, watery solutions.

As pointed out above, the concentration of the hydrotropic salts used in preparing hydrotropic solvents may vary considerably according to the salt selected, the crude material to be treated, the temperature employed, etc. Therefore, the suitable minimum concentration of the salt solution will vary according to the particular hydrotropic salt used. However, where it is specified that the solution of the salt is a "hydrotropic solvent," it necessary follows, and it is to be understood, that the solution contains a sufficient amount of the salt to cause the solution thereof to serve in the practice of the process as a solvent for the nitro impurities with some measure of success. Thus, it is to be understood, that a "hydrotropic solvent" will in every case, regardless of the hydrotropic salt used, contain in excess of the minimum amount of such salt required to produce a solvent for the nitro impurities to be removed in the practice of the process.

While I have described in detail the preferred practice of the present invention, it is to be understood that the details of procedure may be variously modified without departing from the spirit of the invention or the scope of the subjoined claims.

I claim:

1. The process of purifying a benzene derivative having a single benzene ring which is nitrated in said benzene ring, which derivative has mixed therewith another such derivative of a different degree of nitration, which comprises the step of subjecting the product to the action of an aqueous solution of a readily soluble salt of a mononuclear acid of the benzene series.

2. The process of purifying a tri-nitro-benzene-derivative having a single benzene ring which is nitrated in said benzene ring, which derivative has mixed therewith a lower such derivative, which comprises the step of subjecting the product to the action of an aqueous solution of a readily soluble salt of a mononuclear acid of the benzene series, whereby the lower benzene derivative is removed in solution from said tri-nitro-benzene-derivative which is substantially insoluble in the solution.

3. The process of purifying crude trinitrotoluene which comprises the step of subjecting the crude material to the action of an aqueous solution of a readily soluble salt of a mononuclear acid of the benzene series.

4. The process of purifying crude trinitrotoluene which comprises the step of subjecting the crude material to the action of an aqueous solution of a readily soluble salt of a mononuclear acid of the benzene series selected from the group consisting of xylenesulfonic acid, cymenesulfonic acid, and benzoic acid.

5. In a process of raising the setting point of impure trinitrotoluene wherein lower nitrotoluenes present as impurities are removed from the impure product, the improvement which comprises subjecting the impure product to be purified to the action of an aqueous solution of a readily soluble salt of a mononuclear acid of the benzene series, whereby the lower nitrotoluenes are removed in solution from the trinitrotoluene which is substantially insoluble in such solution.

6. In a process of raising the setting point of impure trinitrotoluene wherein lower nitrotoluenes present as impurities are removed from the impure product, the improvement which comprises subjecting the impure product to be purified to the action of an aqueous solution of a readily soluble salt of a mononuclear acid of the benzene series selected from the group consisting of xylenesulfonic acid, cymenesulfonic acid, and benzoic acid, whereby the lower nitrotoluenes are removed in solution from the trinitrotoluene which is substantially insoluble in such solution.

7. The process of the purifying crude trinitrotoluene which comprises subjecting the same to the action of an aqueous solution of a readily soluble salt of a mononuclear acid of the benzene series whereby nitrotoluene impurities in the crude material are removed in solution from the trinitrotoluene which is substantially insoluble in such solution, separating the trinitrotoluene from the accompanying liquor, and washing and drying the purified trinitrotoluene.

8. The process of purifying crude trinitrotoluene which comprises subjecting the same to the action of an aqueous solution of a readily soluble salt of a mononuclear acid of the benzene series, selected from the group consisting of xylenesulfonic acid, cymenesulfonic acid, and benzoic acid, whereby nitrotoluene impurities in the crude material are removed in solution from the trinitrotoluene which is substantially insoluble in such solution, separating the trinitrotoluene from the accompanying liquor, and washing and drying the purified trinitrotoluene.

RALPH H. McKEE.